US012766531B2

(12) United States Patent
Chen et al.

(10) Patent No.: US 12,766,531 B2
(45) Date of Patent: Oct. 20, 2026

(54) AIR SEALING MECHANISM FOR DELIVERY OF COMPRESSED AIR IN A SPRAYING DEVICE

(71) Applicant: GloryMakeup Inc., Taipei City (TW)

(72) Inventors: Wen-Hsing Chen, Taipei City (TW); Daniel Ariel Donohue, Miami, FL (US); Po-Wen Cheng, Taipei City (TW); Szu-Wei Wang, New Taipei City (TW); Ko-Ming Huang, New Taipei City (TW)

(73) Assignee: GloryMakeup Inc., Taipei City (TW)

( * ) Notice: Subject to any disclaimer, the term of this patent is extended or adjusted under 35 U.S.C. 154(b) by 164 days.

(21) Appl. No.: 18/805,508

(22) Filed: Aug. 14, 2024

(65) Prior Publication Data

US 2026/0048405 A1 Feb. 19, 2026

(51) Int. Cl.
*B05B 7/06* (2006.01)
*B05B 7/24* (2006.01)

(52) U.S. Cl.
CPC ............ *B05B 7/066* (2013.01); *B05B 7/2408* (2013.01)

(58) Field of Classification Search
CPC .............................. B05B 7/066; B05B 7/2408
USPC ........................................................ 239/424
See application file for complete search history.

(56) References Cited

U.S. PATENT DOCUMENTS 2,686,944 A * 8/1954 Gubelin .................. A61L 9/122 261/DIG. 85
3,298,674 A * 1/1967 Gilbertson .............. A61L 9/122 261/DIG. 88
4,078,891 A * 3/1978 Madjar ................... A61L 9/122 422/305
4,601,886 A * 7/1986 Hudgins ................... F24F 3/12 261/DIG. 65
4,890,791 A * 1/1990 Hoffman ................. A61L 9/127 239/326
5,023,020 A * 6/1991 Machida ................... F24F 3/12 261/DIG. 65
5,167,877 A * 12/1992 Pai .......................... A61L 9/125 261/DIG. 88
2007/0181706 A1* 8/2007 Yeh ......................... A61L 9/122 239/34

(Continued)

OTHER PUBLICATIONS

International Search Report and Written Opinion of the International Searching Authority, PCT/CN2024/121815 mailed May 6, 2025.

*Primary Examiner* — Chee-Chong Lee
(74) *Attorney, Agent, or Firm* — Tong J. Lee

(57) ABSTRACT

An air supply assembly in a spraying device delivers compressed air in an air-sealed delivery path. The assembly includes a concave air output mouth facing the front side, and a nozzle slider having a slider cover on top. The nozzle slider includes a backward-facing slanted surface and an air tube to receive the air. The slider cover includes a peg that extends downward from the bottom. When the slider cover is pushed down, the peg moves down the slanted surface and the nozzle slider moves forward to form an air-sealed contact with an inner side of a center wall of a disk tray to deliver the air to a pod at an outer side of the center wall. When the slider cover moves back up, the peg moves up the slanted surface and the nozzle slider moves backward. The nozzle slider does not rotate when the disk tray rotates horizontally.

18 Claims, 12 Drawing Sheets

(56) References Cited

U.S. PATENT DOCUMENTS

| | | | | |
|---|---|---|---|---|
| 2008/0265060 | A1* | 10/2008 | Canfield | B05B 7/2416 222/401 |
| 2012/0222675 | A1* | 9/2012 | Dunne | A61M 15/0045 128/203.15 |
| 2013/0068788 | A1* | 3/2013 | Gasper | B65D 83/386 222/144.5 |
| 2014/0158722 | A1* | 6/2014 | Wong | A45D 33/025 222/630 |
| 2014/0252127 | A1* | 9/2014 | Fedorov | B05B 7/2424 239/305 |
| 2017/0079409 | A1* | 3/2017 | Delia | A45D 40/222 |
| 2018/0192761 | A1* | 7/2018 | McMahon | A45D 34/04 |
| 2019/0053608 | A1* | 2/2019 | Staton | B01F 33/8442 |
| 2019/0160195 | A1* | 5/2019 | Kelsen | A61L 9/125 |
| 2019/0192717 | A1* | 6/2019 | Harwig | B05B 17/0684 |
| 2019/0336637 | A1* | 11/2019 | Webster | A61L 9/042 |
| 2020/0009284 | A1* | 1/2020 | Kihm | A61L 9/122 |
| 2021/0053086 | A1* | 2/2021 | Liu | B05B 17/063 |
| 2021/0059380 | A1* | 3/2021 | Chen | B01F 27/808 |
| 2021/0060200 | A1* | 3/2021 | Shin | A61L 9/122 |
| 2021/0100923 | A1* | 4/2021 | Gimeno Asin | B01F 33/8442 |
| 2021/0128773 | A1* | 5/2021 | Nguyen | A61L 9/125 |
| 2021/0138101 | A1* | 5/2021 | Nakano | A61L 9/125 |
| 2021/0170060 | A1* | 6/2021 | Galvão | A61L 9/14 |
| 2021/0235846 | A1* | 8/2021 | Clappaz | B05B 12/14 |
| 2022/0008599 | A1* | 1/2022 | Michelle | A61L 9/14 |
| 2022/0143641 | A1* | 5/2022 | Takata | B05B 11/1084 |
| 2022/0266282 | A1* | 8/2022 | Chien | B05B 7/2472 |
| 2023/0052182 | A1* | 2/2023 | Jang | A45D 19/06 |
| 2023/0405620 | A1* | 12/2023 | Santoemma | B05B 7/2437 |

* cited by examiner

AIR SEALING MECHANISM FOR DELIVERY OF COMPRESSED AIR IN A SPRAYING DEVICE

TECHNICAL FIELD

Embodiments of the invention relate to an air sealing mechanism used in a spraying device to prevent leakage of compressed air in the delivery path.

BACKGROUND OF THE INVENTION

Air sealing promotes efficient and effective spraying operation. Proper air sealing prevents air leakage and maintains air pressure. Air leakage can lead to inconsistent spraying patterns and reduced spraying efficiency. Inconsistent air pressure can cause various problems in the atomization of the spray material, such as non-uniform sprays and intermittent spray output. One example of a spraying device is a makeup machine. Proper sealing in the air delivery path of a makeup machine is important for producing consistent spray patterns on a user's skin.

SUMMARY OF THE INVENTION

In one embodiment, an air supply assembly is provided in a spraying device for delivering compressed air to a pod that includes a nozzle and contains a liquid. The air supply assembly includes a nozzle slider and a slider cover. The nozzle slider includes a concave air output mouth facing a front side of the spraying device, a backward-facing slanted surface, a groove at a bottom end of the slanted surface, and an air tube to receive the compressed air. The slider cover is on top of the nozzle slider. A bottom surface of the slider cover includes a peg extending downward. When the slider cover is pushed down, the peg moves down the slanted surface into the groove and the nozzle slider moves forward to form an air-sealed contact with an inner side of a center wall of a disk tray, to thereby deliver the compressed air through an air hole in the center wall to the pod. The pod is on the disk tray and at an outer side of the center wall. When the slider cover moves back up, the peg moves up the slanted surface and the nozzle slider moves backward. The nozzle slider does not rotate when the disk tray rotates horizontally.

In another embodiment, a disk head of a spraying device is provided for delivering compressed air to a pod that includes a nozzle and contains a liquid. The disk head includes a disk tray on which the pod is placed, the disk tray including a center wall that defines a hollow center. The disk head further includes a motor module to rotate the disk tray horizontally around a vertical axis that extends through the hollow center of the disk tray. The disk head further includes the aforementioned air supply assembly.

Other aspects and features will become apparent to those ordinarily skilled in the art upon review of the following description of specific embodiments in conjunction with the accompanying figures.

BRIEF DESCRIPTION OF DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION OF THE INVENTION

Figure 1:
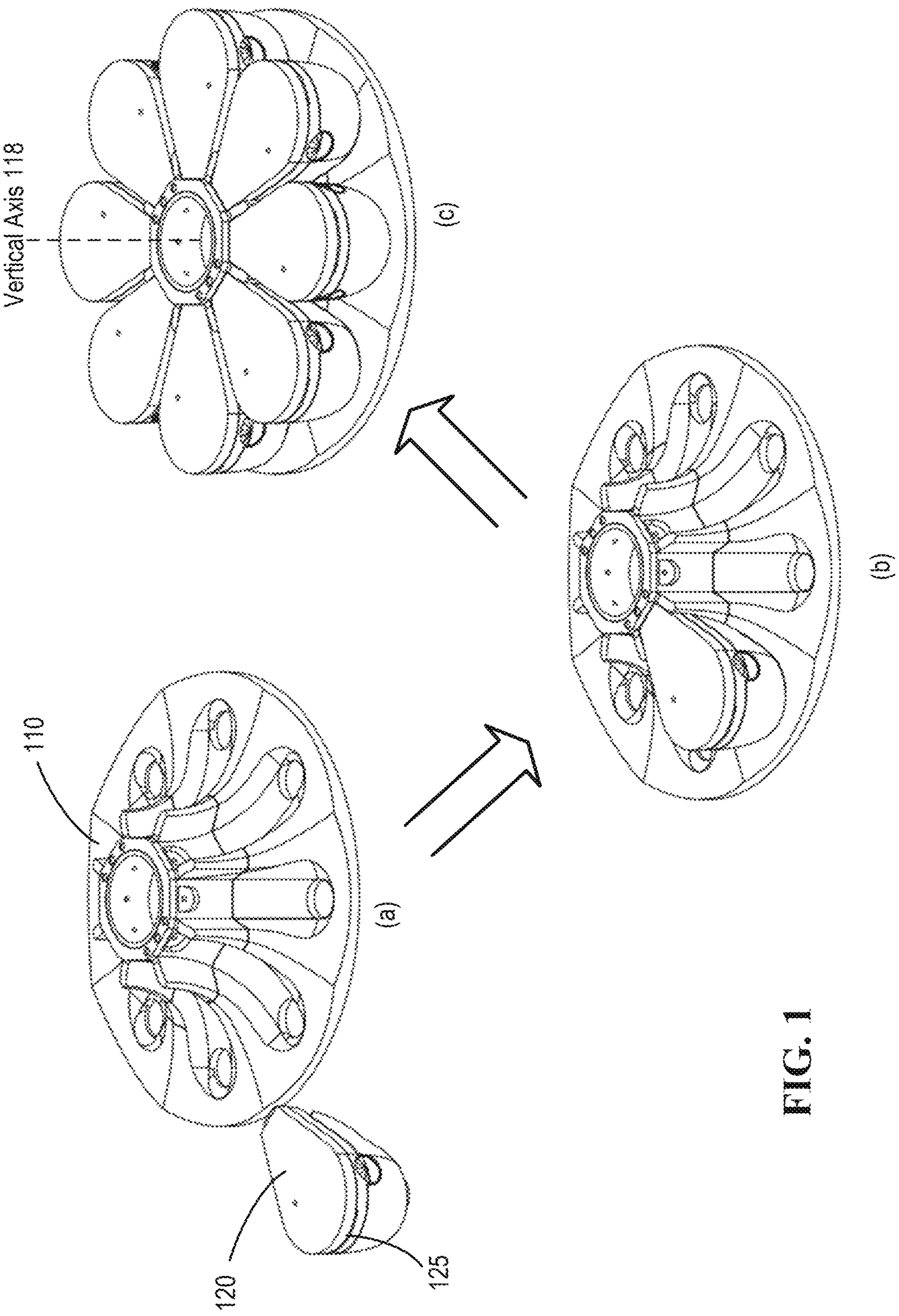
FIG. 1 illustrates the assembling of pods onto a disk tray according to one embodiment.

In the following description, numerous specific details are set forth. However, it is understood that embodiments of the invention may be practiced without these specific details. In other instances, well-known circuits, structures, and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the disclosed air sealing mechanism can be used in the air delivery path of a spraying device that sprays atomized liquids. The spraying device includes an air delivery assembly in a disk head to forward compressed air from an air source to an air hole that leads to a liquid-containing pod. The pod has an air inlet that is aligned with the air hole, and a nozzle for spraying an atomized liquid. A non-limiting example of the spraying device is an automatic makeup machine that outputs spray-on skin products on a user's skin. The disk head includes a disk lid, which is closed when the spraying device is in operation. The air delivery assembly forms air sealing around the air hole when the disk lid is closed, and releases the air sealing when the disk lid is opened. In one embodiment, the air delivery assembly includes a nozzle slider that slides forward (e.g., toward a spray target) to form the air sealing when the disk lid is closed, and slides backward to release the air sealing when the disk lid is opened.

In one embodiment, the disk head includes a rotating platform underneath a disk tray to horizontally rotate the disk tray. The disk tray includes multiple slots, each slot can be loaded with a pod containing a liquid (e.g., a spray-on skin product). Each pod may be individually placed in and removed from the corresponding slot in the disk tray. The disk tray includes an air hole in each slot to allow compressed air to pass from the air delivery assembly to the corresponding pod. In one embodiment, the air inlet in the pod is fitted with a sealing rubber ring. The sealing rubber ring of the pod forms an airtight contact around the air hole in the corresponding disk tray slot from an outer side of the disk tray. When the disk lid is closed and a pod is rotated to the front for spraying, the nozzle slider is pressed against the air hole of the front slot from the inner side of the disk tray. Thus, both inner and outer sides of the air hole are air-sealed for optimized air delivery.

In this disclosure, the term "front side" refers to the user-facing side. Thus, the front sides of the spraying device, the disk head and its components, the air supply assembly and its components, are the same as the user-facing side. The term "forward" refers to the direction toward the front side, and the term "backward" refers to the direction opposite the front side.

FIG. 1 illustrates the assembling of pods 120 onto a disk tray 110 according to one embodiment. Referring to (a) and (b) of FIG. 1, a pod 120 is inserted into a slot in the disk tray 110. The pod 120 contains a liquid, such as a spray-on skin product, which can be atomized by compressed air and sprayed out from a nozzle 125. In (c) of FIG. 1, the disk tray 110 is shown to be full-loaded with the pods 120; i.e., all slots in the disk tray 110 are occupied by the pods 120.

Figure 2:
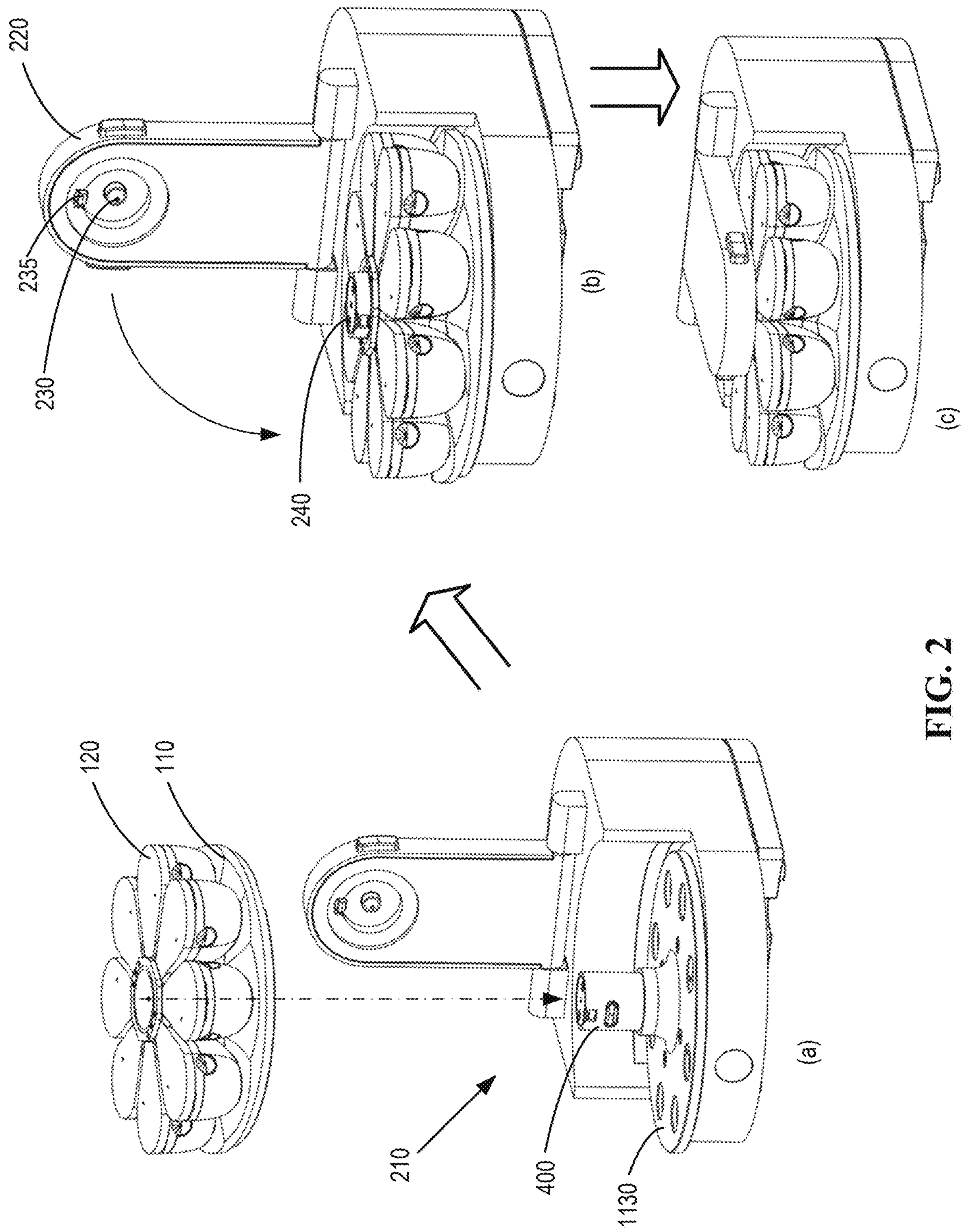
FIG. 2 illustrates the assembling of a fully-loaded disk tray onto a disk head according to one embodiment.

FIG. 2 illustrates the assembling of a fully-loaded disk tray onto a disk head 210 according to one embodiment. In one embodiment, the disk head 210 is part of a spraying device. Referring to (a) of FIG. 2, the disk head 210 includes an air delivery assembly 400 placed in the center of a rotating platform 1130. The disk tray 110, which is fully-loaded with the pods 120, is to be placed in the axial direction onto the rotating platform 1130, with the center of the disk tray 110 aligned with the center of the air delivery assembly 400. Further details on the air delivery assembly 400 will be described with reference to FIG. 4. Referring to (b) of FIG. 2, the top of the air delivery assembly 400 is a slider cover 240 that protrudes above the center of the disk tray 110 after the assembling of the disk tray 110 on the disk head 210. The disk head 210 includes a disk lid 220 having a pointed tip 230 attached to the underside. When the disk lid 220 flips down, a user may press side buttons of the disk lid 220 to engage a latch 235 to the slider cover 240 to thereby securely close the disk lid 220. When the disk lid 220 is closed as shown in (c) of FIG. 2, the pointed tip 230 on the disk lid 220 presses down on the slider cover 240 to cause air sealing to form in the air delivery path. Further details on the air sealing will be provided below.

Figure 3A:
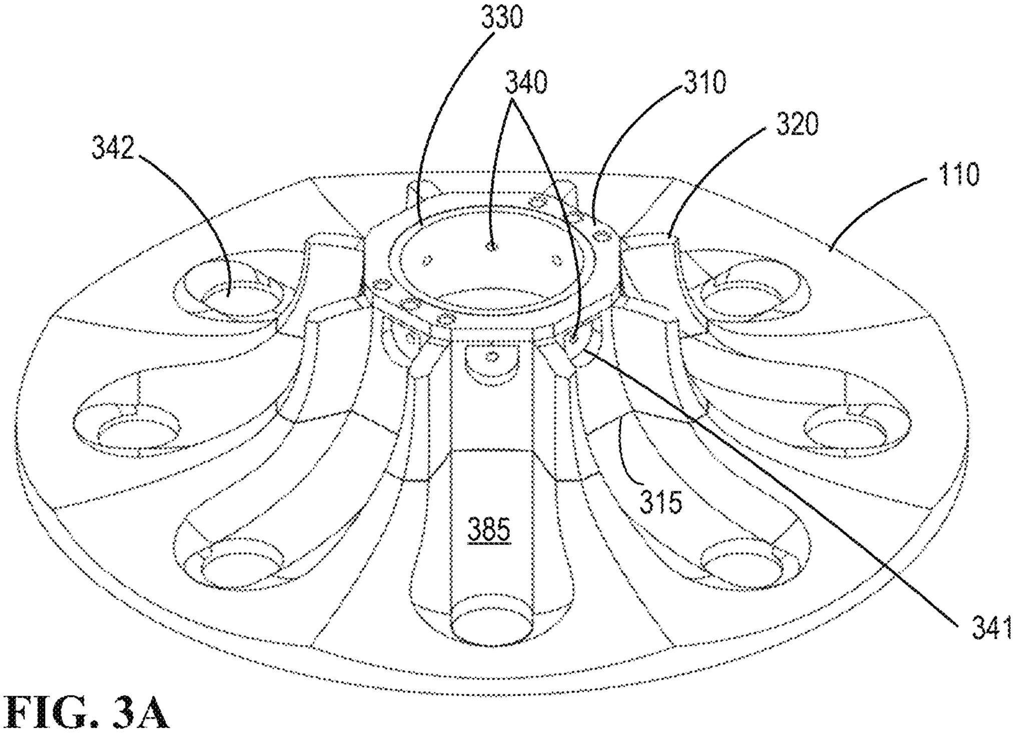
FIG. 3A is a partial view of the disk tray according to one embodiment.

FIG. 3A is a partial view of the disk tray 110 according to one embodiment. In this example, the disk tray 110 is substantially circular with a hollow center defined by a center wall 310 having a circular shape. Surrounding the center wall 310 are multiple slots 385 (e.g., 8 or a different number) that are separated from one another by side fins 320. Each pod 120 is placed in a slot 385. During a spray operation, the disk tray 110 rotates horizontally around a vertical axis 118 (FIG. 1 (*c*)) that extends through the hollow center. The pods 120 alternately receive the compressed air from the air supply assembly 400 (FIG. 4) to spray liquids from respective nozzles 125 (FIG. 1(*a*)).

In one embodiment, a sealing rubber layer 330 is attached to the inner side of the center wall 310. Each slot includes a top indent 341 and a bottom indent 342 to receive a top peg 710 and a bottom peg 720 (FIG. 7B), respectively, of the pod 120 placed in that slot. The top indent 341 includes an air hole 340, which goes through the center wall 310 and the sealing rubber layer 330 to reach the inner side of the center wall 310. The air hole 340 provides a passage for delivering compressed air from the air delivery assembly 400 (FIG. 4) to the pod 120.

In one embodiment, the disk tray 110 includes an upper portion and a lower portion, the boundary between which is shown in FIG. 3A as a line 315. In one embodiment, the upper portion is made of a first material (e.g., aluminum) and the lower portion is made of a second material (e.g., a transparent/translucent material such as polycarbonate). In an alternative embodiment, both the upper and lower portions are made of the same material (e.g., aluminum). The top indent 341 and the air hole 340 are within the upper portion. The first material is chosen to optimize air sealing when the air inlet of the pod 120 is pressed tightly against the top indent 341 to receive compressed air from the air hole 340. A non-limiting example of the first material is aluminum, which provides structural strength and can improve air sealing. When the lower portion is made of a transparent/translucent material, a light-emitting diode (LED) light may be embedded in the disk head 210 (e.g., under or on a side of the disk tray 110) to illuminate the pods 120. In one embodiment, the bottom part of the pod is a liquid container, which may be made of a transparent/translucent material such that the liquid inside can be seen from outside.

Figure 3B:
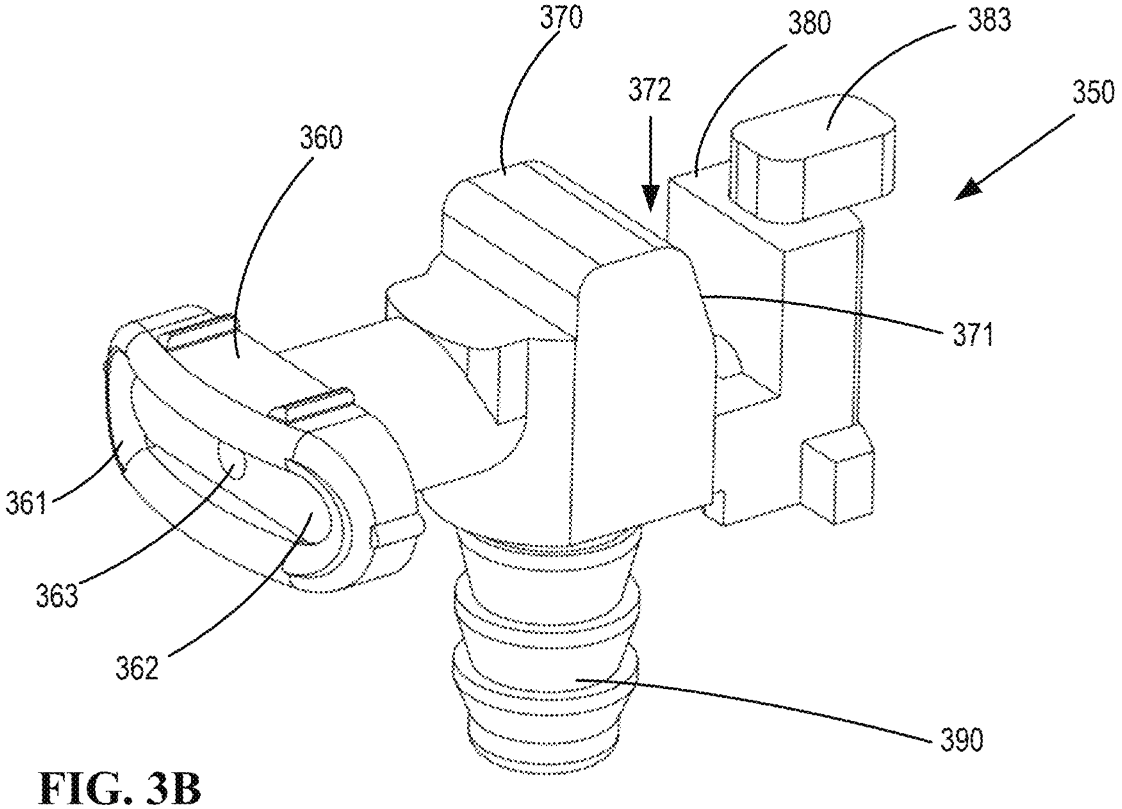
FIG. 3B illustrates a nozzle slider in the air delivery assembly according to one embodiment.

FIG. 3B illustrates a nozzle slider 350 according to one embodiment. The nozzle slider 350 is a component of the air delivery assembly 400 shown in FIG. 4. The nozzle slider 350 includes a front section 360, a middle section 370, a back section 380, and a groove 372 between the middle section 370 and the back section 380. The front section 360 includes a lip 361 surrounding a concave air output mouth 362, and the concave air output mouth 362 further includes an air outlet 363 for delivering compressed air to a selected pod 120. During operation, the air outlet 363 points radially to the direction of the spray target. The lip 361 and the concave air output mouth 362 are elongated sideways; that is, their width is larger than height. When installed in the disk head 210 with the disk lid 220 closed (FIG. 2), the lip 361 forms an airtight sealing with the sealing rubber layer 330 of the disk tray 110 (FIG. 3A). That is, the front surface of the lip 361 has a curvature that matches the curvature of the sealing rubber layer 330.

The middle section 370 includes a backward-slanting surface ("slanted surface 371"), which faces backward and upward. The slanted surface 371 slopes downwards into a groove 372 at the bottom end of the slanted surface 371. A peg 510 extending downward from the bottom surface of the slider cover 240 (FIG. 2) is pushed into the groove 372 when the disk lid 220 flips down and closes. The bottom of the middle section 370 is an air tube 390, which fits into a flexible air pipe 410 (FIG. 4) for receiving compressed air from an air source. The back section 380 includes a stopper 383. The stopper 383 is substantially L-shaped; the long end of the L-shape extends backward.

Figure 4:
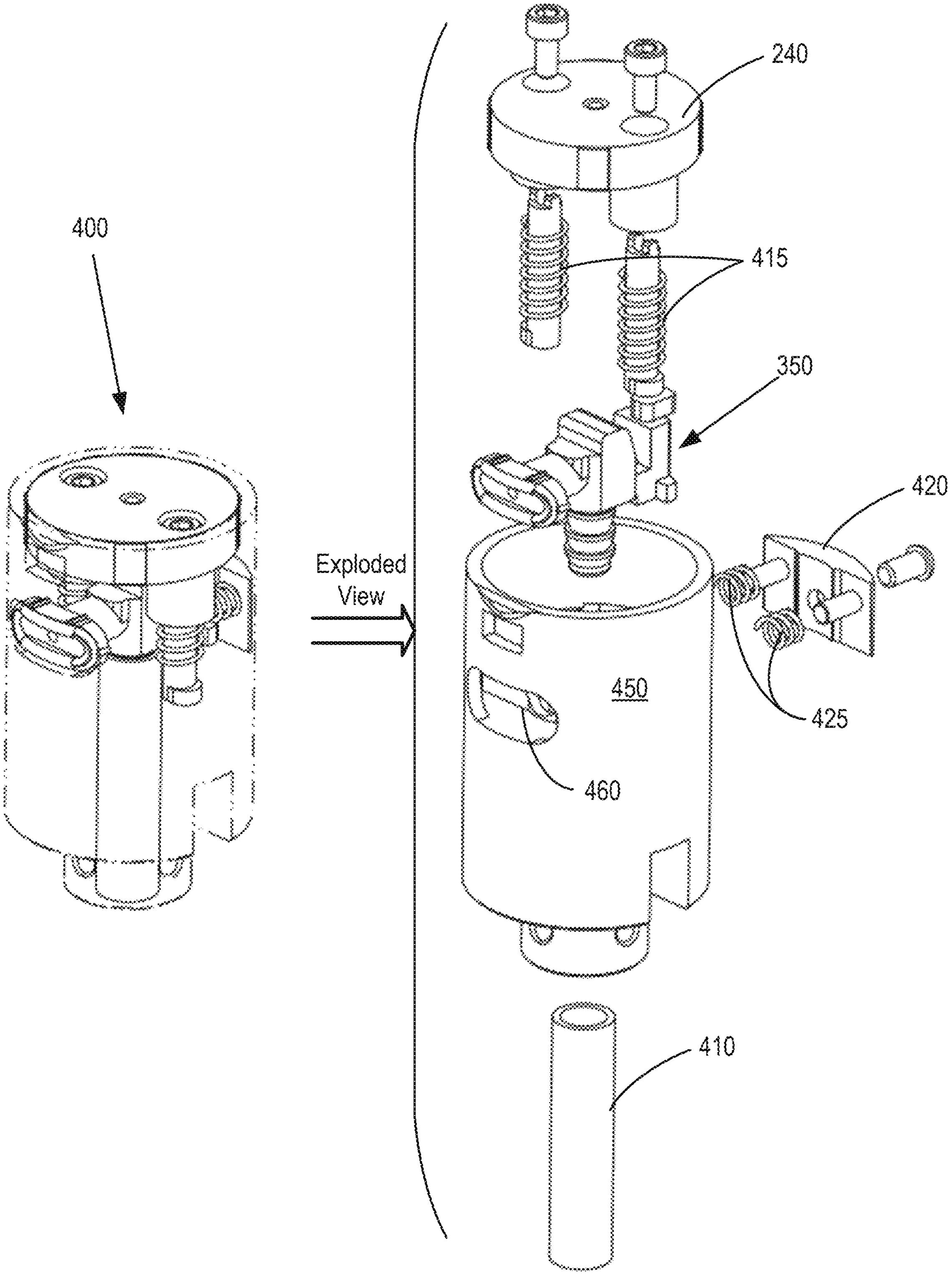
FIG. 4 illustrates an exploded view of an air delivery assembly according to one embodiment.

FIG. 4 illustrates an exploded view of the air delivery assembly 400 according to one embodiment. Referring also to FIG. 3B, the air delivery assembly 400 includes a holder 450, the slider cover 240, vertical springs 415, the nozzle slider 350, a backend spring holder 420, horizontal springs 425, and the flexible air pipe 410. The air tube 390 of the nozzle slider 350 is inserted into the flexible air pipe 410. Compressed air from an air source goes into the flexible air pipe 410 to reach the nozzle slider 350. An air channel inside the nozzle slider 350 allows the air to pass from the middle section 370 to the front section 360 of the nozzle slider 350 and to exit from the air outlet 363. The outer surface of the holder 450 is substantially cylindrical. The holder 450 includes an elongated opening 460 at the front side (i.e., the user-facing side) of the holder 450. The elongated lip 361 of the nozzle slider 350 fits into the elongated opening 460. The backend spring holder 420 is attached to the back side of the back section 380. The nozzle slider 350 and the attached backend spring holder 420 move forward and backward in tandem.

Referring to FIG. 1-FIG. 4, in one embodiment, the vertical springs 415 extend downward vertically from the bottom of the slider cover 240. When the disk lid 220 is closed, which causes the slider cover 240 to move downward (FIG. 10A), the vertical springs 415 are compressed against respective stoppers in the holder 420. When the disk lid 220 is opened, which causes the slider cover 240 to move up (FIG. 9A), the vertical springs 415 expand to their original length. The two vertical springs 415 are positioned at the right and left sides of the middle section 370 of the nozzle slider 350. The horizontal springs 425 are attached to the front side of the backend spring holder 420 and extend forward horizontally. When the disk lid 220 is closed, which causes the nozzle slider 350 and the backend spring holder 420 to move forward, the horizontal springs 425 are compressed against respective stoppers in the holder 450. When the disk lid 220 is opened, which causes the nozzle slider 350 and the backend spring holder 420 to move backward, the horizontal springs 425 expand to their original length. The two horizontal springs 425 are positioned at the right and left sides of the back section 380 of the nozzle slider 350.

Figure 5B:
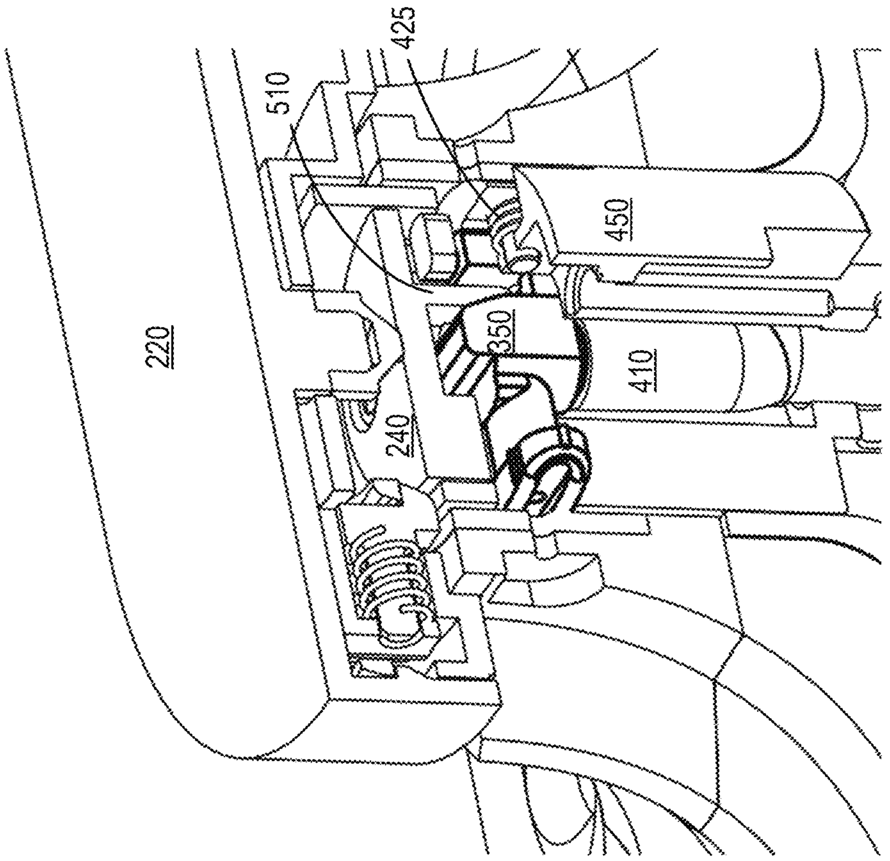
FIG. 5A and FIG. 5B illustrate an angled view of the air delivery assembly with the disk lid opened and closed, respectively, according to one embodiment.
Figure 5A:
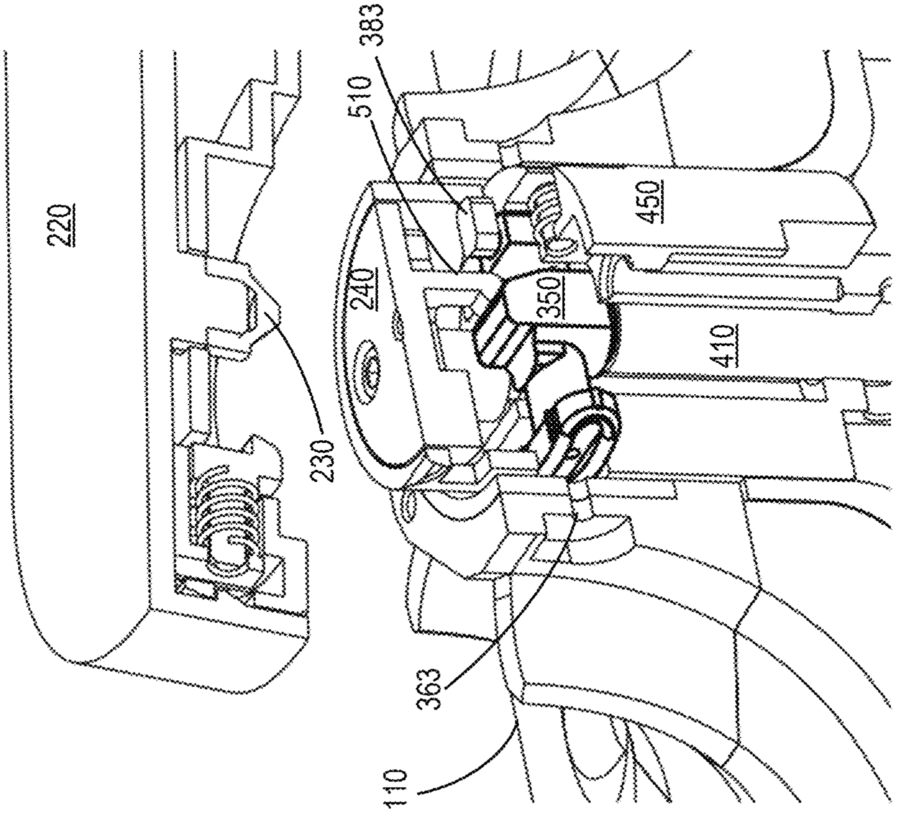

FIG. 5A and FIG. 5B illustrate an angled view of the air delivery assembly 400 when the disk lid 220 is opened and closed, respectively, according to one embodiment. To more clearly illustrate the operation of the air delivery assembly 400, the holder 450 is partially removed from view, while the disk lid 220, the slider cover 240, and the disk tray 110 are shown in a vertical cross-section view. When the disk lid 220 is opened, the slider cover 240 sticks out of the center opening of the disk tray 110. Referring also to FIG. 3B, when the disk lid 220 is closed, the pointed tip 230 at the bottom surface of the disk lid 220 presses down on the slider cover 240, which pushes the peg 510 down the slanted surface 371 into the groove 372. The force on the slanted surface 371 creates a forward momentum for the nozzle slider 350 to move forward, forming an air-sealed contact with an inner side of the center wall 310 of the disk tray 110. More specifically, the air-sealed contact is formed between the lip 361 of the nozzle slider 350 and the sealing rubber layer 330 of the disk tray 110. The forward movement of the nozzle slider 350 causes the flexible air pipe 410 to bend forward.

When the disk lid 220 flips up and opens as shown in FIG. 5A, the vertical springs 415 (FIG. 4) expand to their original length, which helps to pop the slider cover 240 upwards. The upward movement of the slider cover 240 causes the peg 510 to slide out of the groove 372. The horizontal springs 425 expand, creating a backward movement to pull the nozzle slider 350 backward. When the nozzle slider 350 moves backward, the stopper 383 on the nozzle slider 350 is pressed against the holder 450 to stop the nozzle slider 350 from moving further backward such that the nozzle slider 350 returns to its original position (i.e., open-lid position)

Figure 6B:
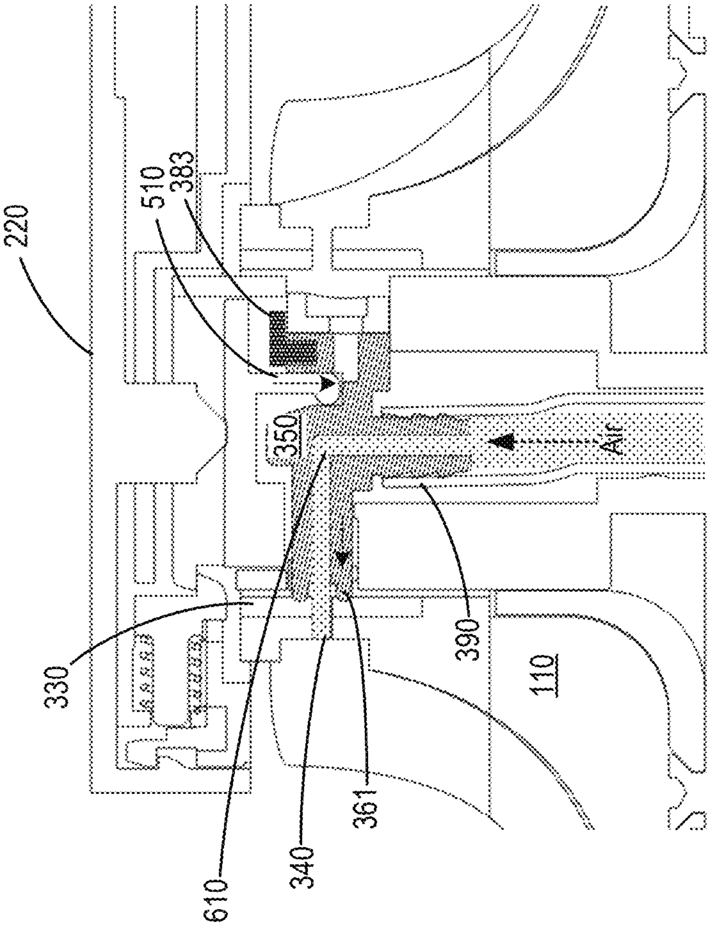
FIG. 6A and FIG. 6B illustrate a side vertical cross-section view of the air delivery assembly with the disk lid opened and closed, respectively, according to one embodiment.
Figure 6A:
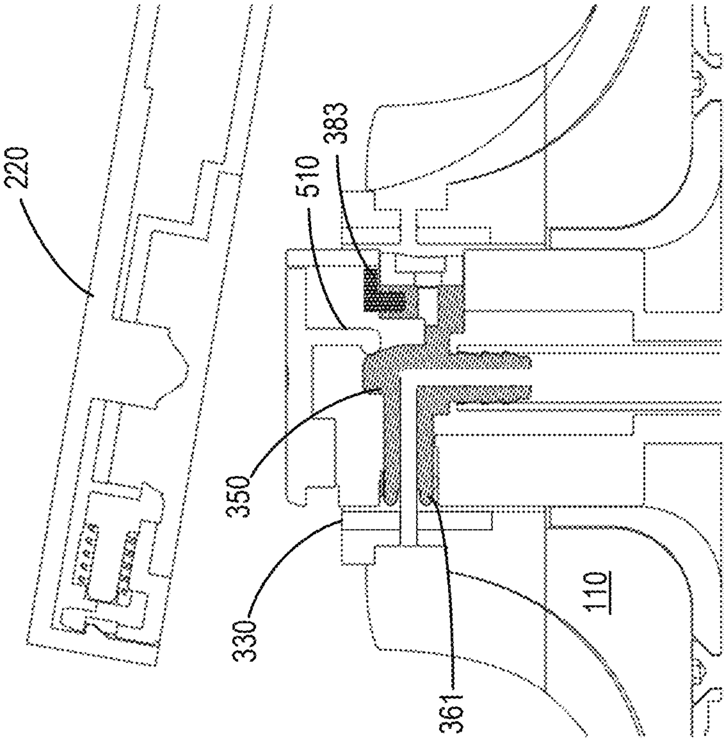

FIG. 6A and FIG. 6B illustrate a side vertical cross-section view of the air delivery assembly 400 with the disk lid 220 opened and closed, respectively, according to one embodiment. In FIG. 6A and FIG. 6B, the peg 510 movements and the forward/backward movements of the nozzle slider 350 as well as the stopper 383 are shown. FIG. 6A shows that when the disk lid 220 is opened, there is a gap between the lip 361 of the nozzle slider 350 and the sealing rubber layer 330 of the disk tray 110. FIG. 6B shows that when the disk lid 220 is closed, the peg 510 moves downward and the nozzle slider 350 moves forward. The lip 361 of the nozzle slider 350 is tightly pressed against the sealing rubber layer 330 to form air sealing around the air hole 340 on the disk tray 110. FIG. 6B also shows that the compressed air flows through an air channel 610 inside the nozzle slider 350 to reach the air hole 340 on the disk tray 110. The air channel 610 extends vertically up from the air tube 390 and turns horizontally forward to the air outlet 363 (FIG. 3B) of the nozzle slider 350.

Figure 7B:
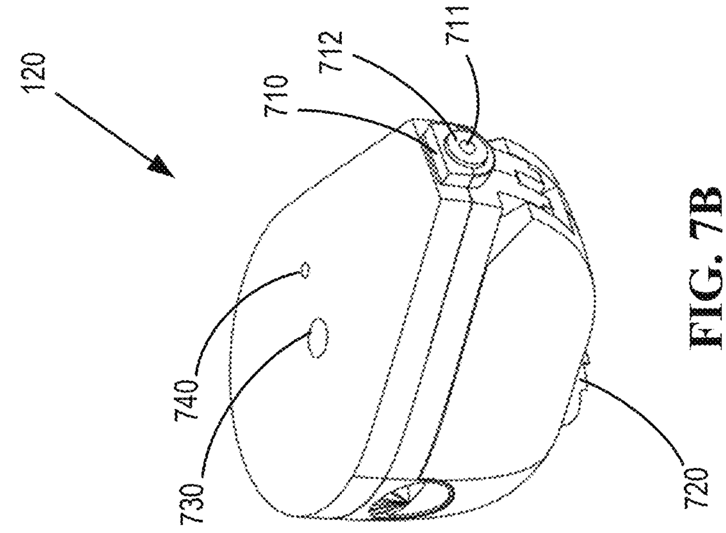
FIG. 7B illustrates an angled view of a pod according to one embodiment.
Figure 7A:
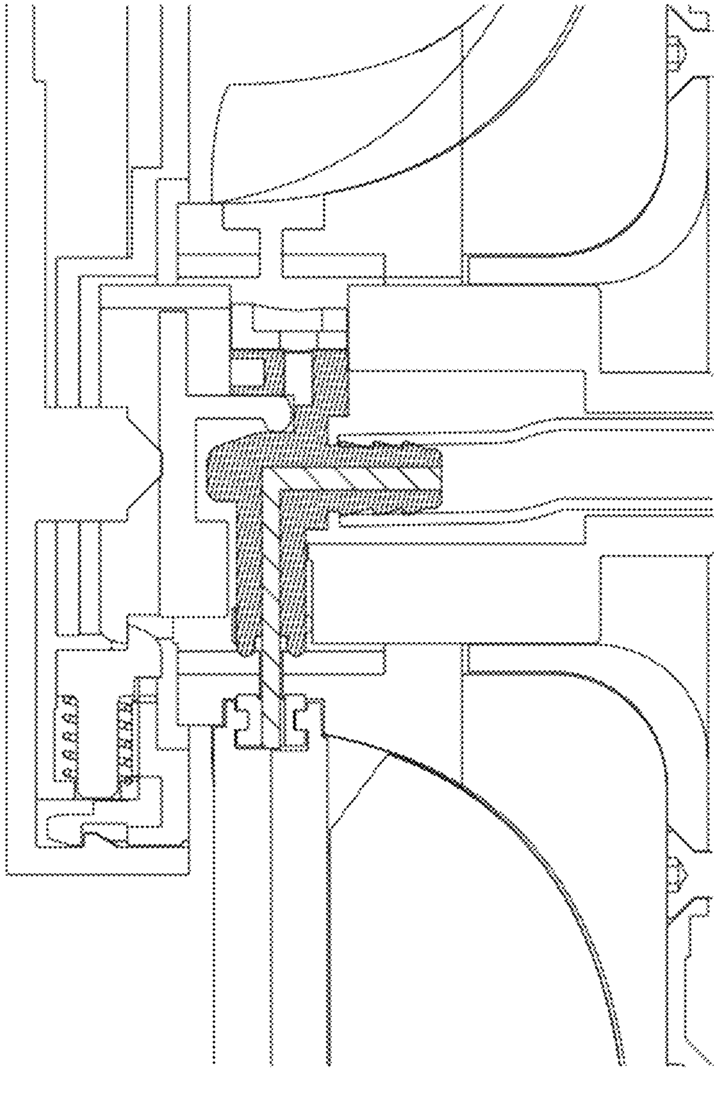
FIG. 7A illustrates a side vertical cross-section view of the air delivery assembly delivering air to a pod on a disk tray according to one embodiment.

FIG. 7A illustrates a side vertical cross-section view of the air delivery assembly 400 delivering air to the pod 120 on the disk tray 110 according to one embodiment. FIG. 7B illustrates an angled view of the pod 120 according to one embodiment. In FIGS. 5A, 5B, 6A, and 6B, the disk tray 110 is shown without any pods 120 to simplify the illustration. FIG. 7A shows the pod 120 placed in the front-facing slot (i.e., the user-facing side) of the disk tray 110. Only the pod that is rotated to the front-facing slot can receive compressed air from the air delivery assembly 400 (FIG. 4). Referring also to FIG. 3A, compressed air from the air source is delivered through the nozzle slider 350 and through the air hole 340 in the center wall 310 of the disk tray 110 to reach the pod 120. The pod 120 includes the top peg 710 and the bottom peg 720, which are placed into corresponding indents (341, 342) at the corresponding locations of each slot 385 in the disk tray 110. In one embodiment, the top surface of the pod 120 includes an identifier such as a radio frequency identifier (RFID) 730 for identifying the liquid contained therein and for authenticating the pod 120 to prevent counterfeits, among other purposes. In one embodiment, the pod 120 may include an air hole 740 that goes through the top surface of the pod 120 into a liquid container in the pod 120. The air hole 740 can help balance the air pressure inside and outside the liquid container during spray operation.

In one embodiment, the top side of the top peg 710 may be parallel to the top surface of the pod 120. In alternative embodiments, the top peg 710 may have any shape. The top peg 710 includes a circular-shaped opening 711 surrounded by a sealing rubber ring 712. This circular-shaped opening 711 is the air inlet of the pod 120. When the pod 120 is placed in a slot on the disk tray 110, the top peg 710 is positioned in the top indent 341 of the slot, and the sealing rubber ring 712 is pressed tightly around the air hole 340 in the slot. The circular-shaped opening 711 is aligned with the air hole 340 in the slot, allowing air to pass from the nozzle slider 350 into the pod 120 with optimal air sealing.

Figure 8B:
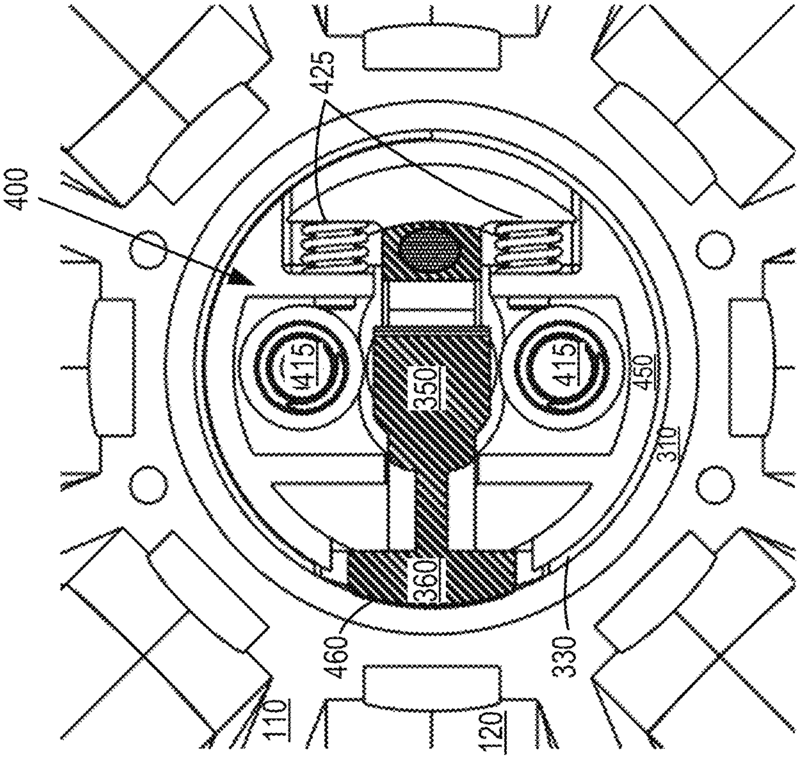
FIG. 8A and FIG. 8B illustrate a top view of the nozzle slider when the disk lid is opened and closed, respectively, according to one embodiment.
Figure 8A:
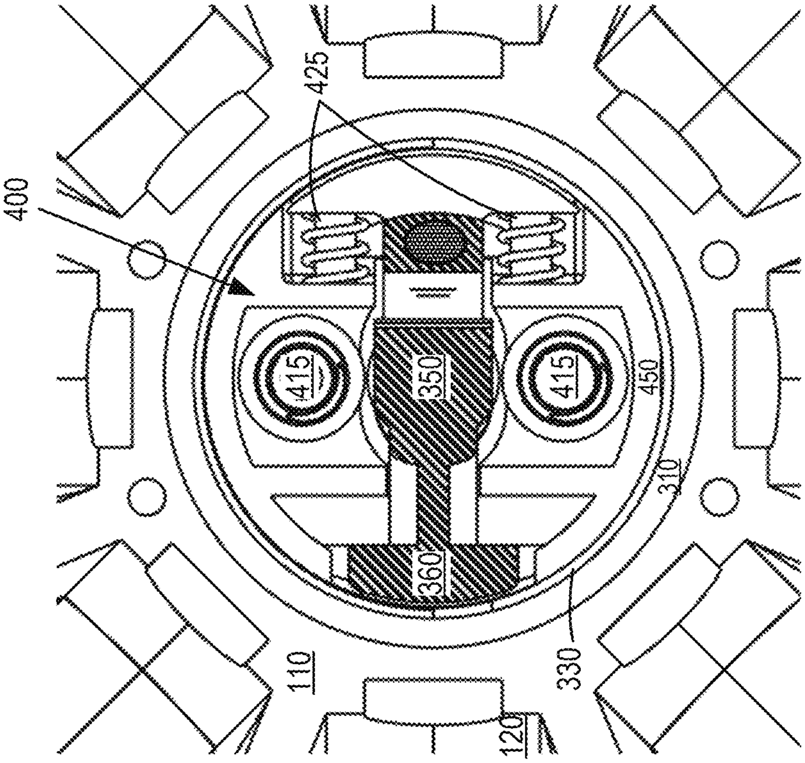

FIG. 8A and FIG. 8B illustrate a top view of the nozzle slider 350 when the disk lid 220 is opened and closed, respectively, according to one embodiment. To simplify the illustration, the disk lid 220 (FIG. 2) is not shown in these figures. Referring also to FIG. 2, the disk tray 110 is fully loaded with pods 120 and is placed on the disk head 210. More specifically, the disk tray 110 is placed on the disk head 210 such that the air supply assembly 400 fits into the hollow center (defined by the center wall 310) of the disk tray 110. When the disk lid 220 is opened as shown in FIG. 8A, the nozzle slider 350 is in the original position inside the holder 450, with both the vertical springs 415 and the horizontal springs 425 relaxed (i.e., in their original lengths). When the disk lid 220 is closed, the nozzle slider 350 moves forward and the front section 360 of the nozzle slider 350 is pushed forward, at least partially through the front-side opening 460 of the holder 450, to press tightly against the sealing rubber layer 330 on the inner side of the center wall 310. Both the vertical springs 415 and the horizontal springs 425 are compressed.

Figure 9B:
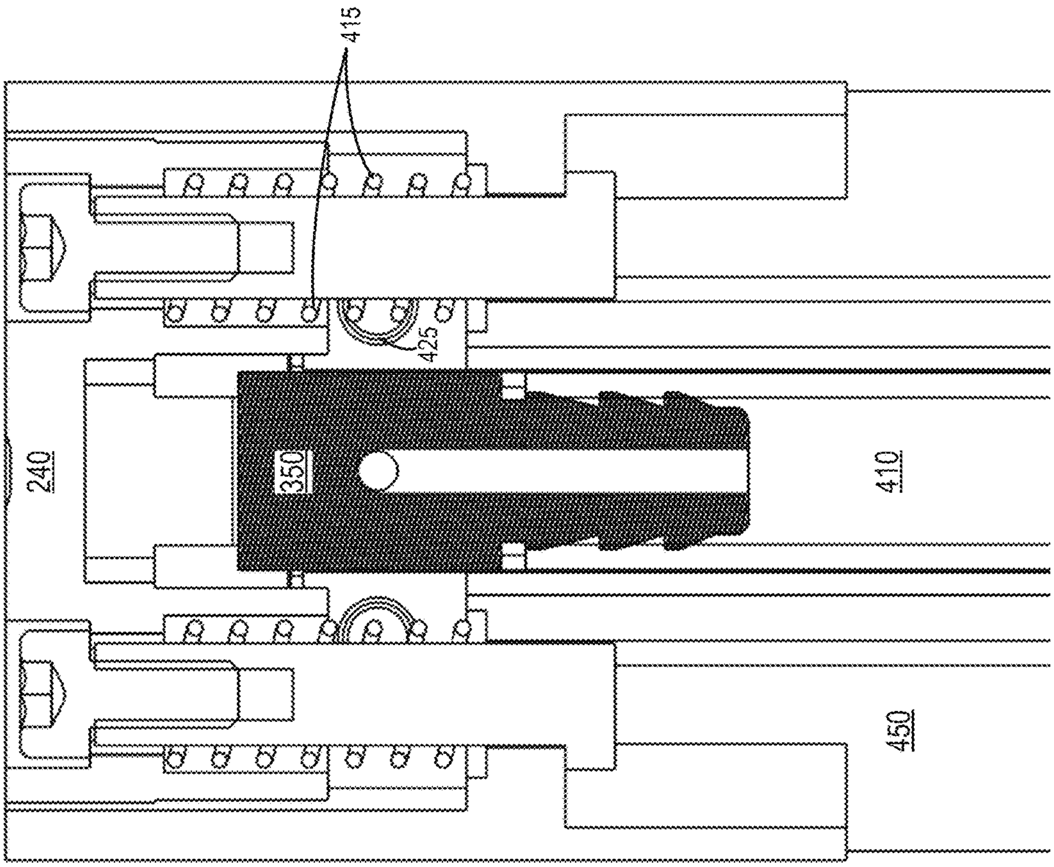
FIG. 9B is a front-side vertical cross-section view of the air delivery assembly when the disk lid is opened according to one embodiment.
Figure 9A:
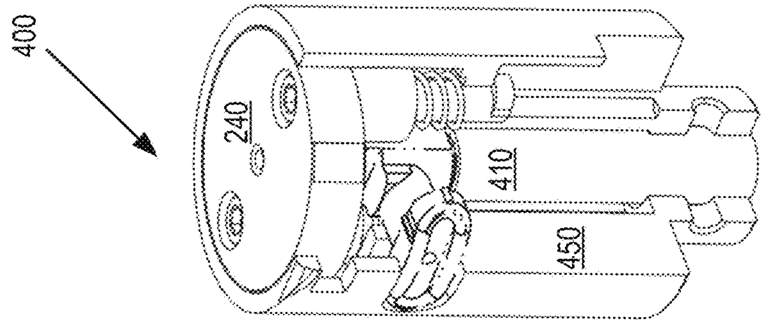
FIG. 9A illustrates the air delivery assembly with a partially removed holder when the disk lid is opened according to one embodiment.
Figure 10B:
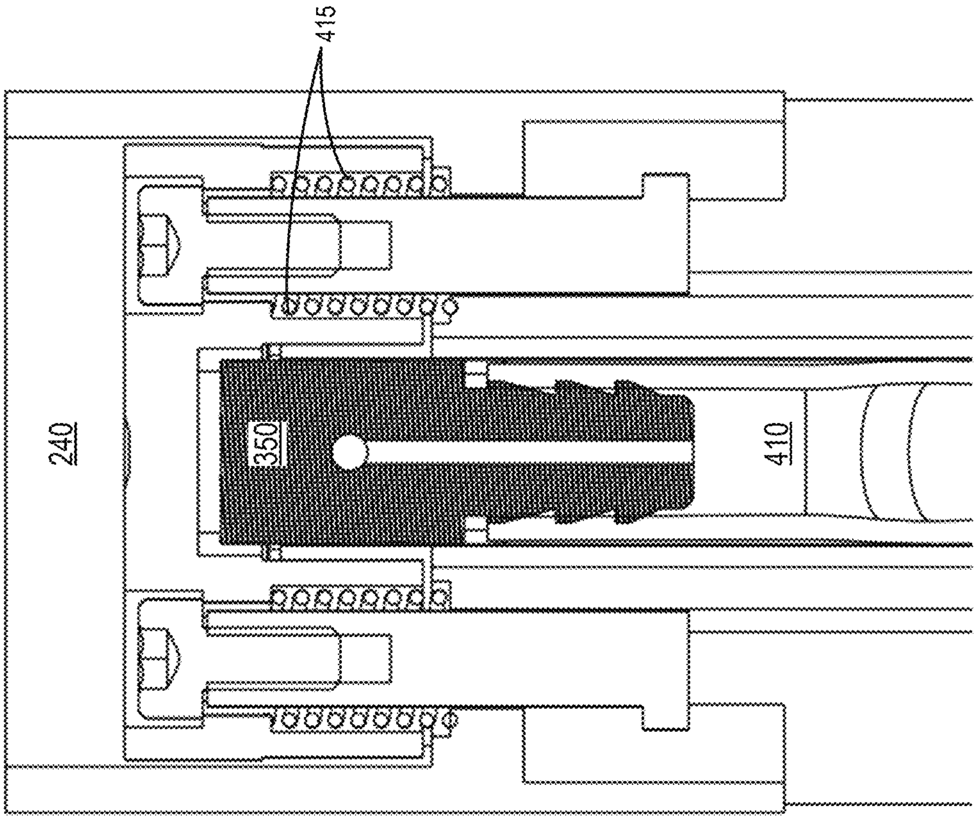
FIG. 10B is a front-side vertical cross-section view of the air delivery assembly when the disk lid is closed according to one embodiment.
Figure 10A:
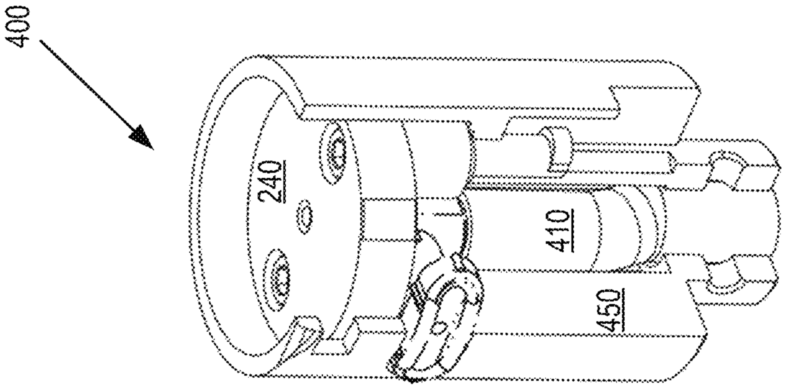
FIG. 10A illustrates the air delivery assembly with a partially removed holder when the disk lid is closed according to one embodiment.

FIG. 9A and FIG. 10A illustrate the air delivery assembly 400 with the holder 450 partially removed to show the interior structure when the disk lid 220 is opened and closed, respectively, according to one embodiment. FIG. 9B and FIG. 10B illustrate a front-side vertical cross-section view of the air delivery assembly 400 when the disk lid 220 is opened and closed, respectively, according to one embodiment. To simplify the illustration, the disk lid 220 (FIG. 2) is not shown in these figures. The front-side view of the air delivery assembly 400 shows that the air delivery assembly 400 is left-right symmetric. These figures show the movements of the components of the air assembly 400 when the disk lid 220 closes down from an open position.

Figure 11:
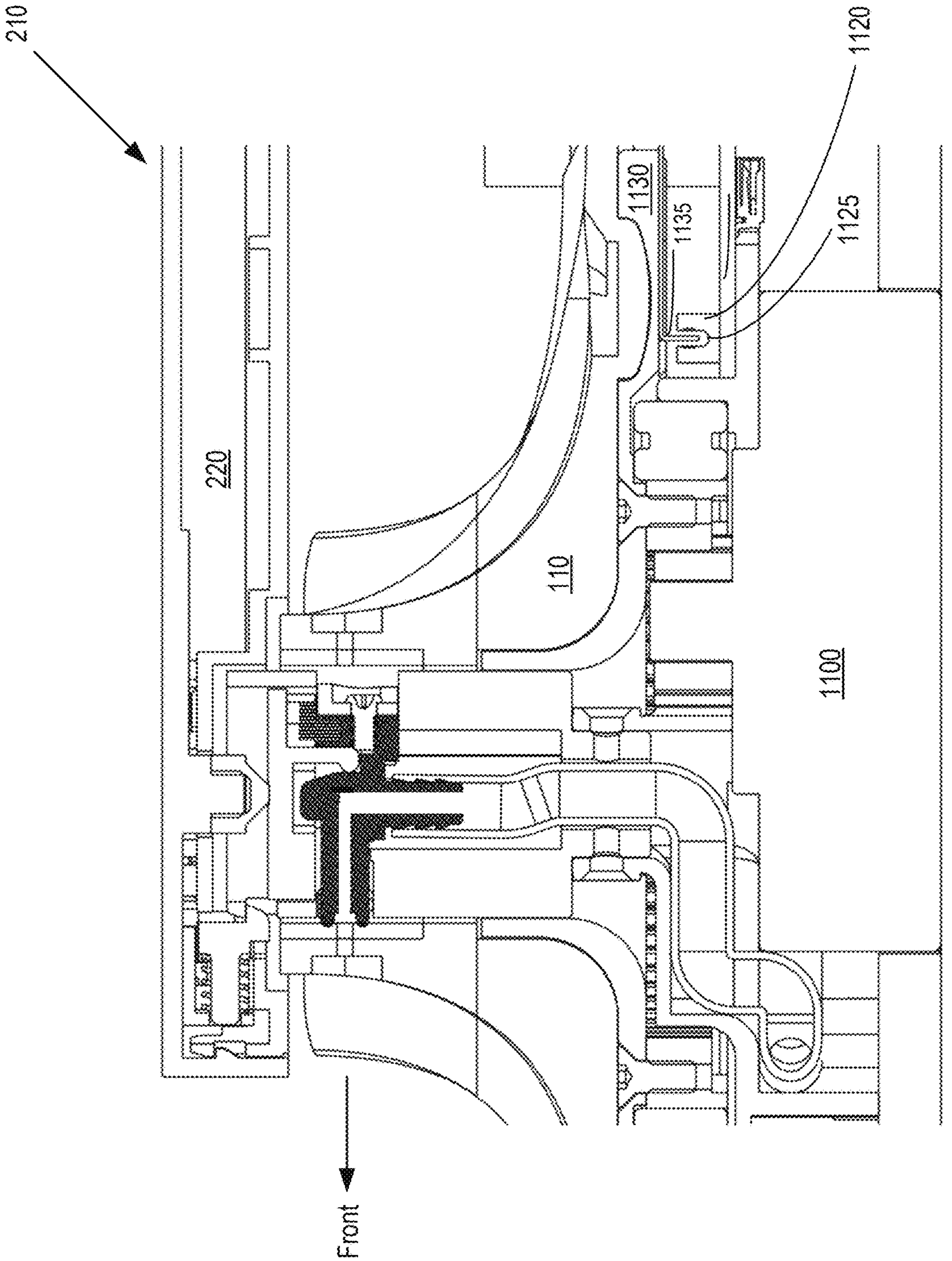
FIG. 11 is a side vertical cross-section view of the disk head according to one embodiment.
Figure 12:
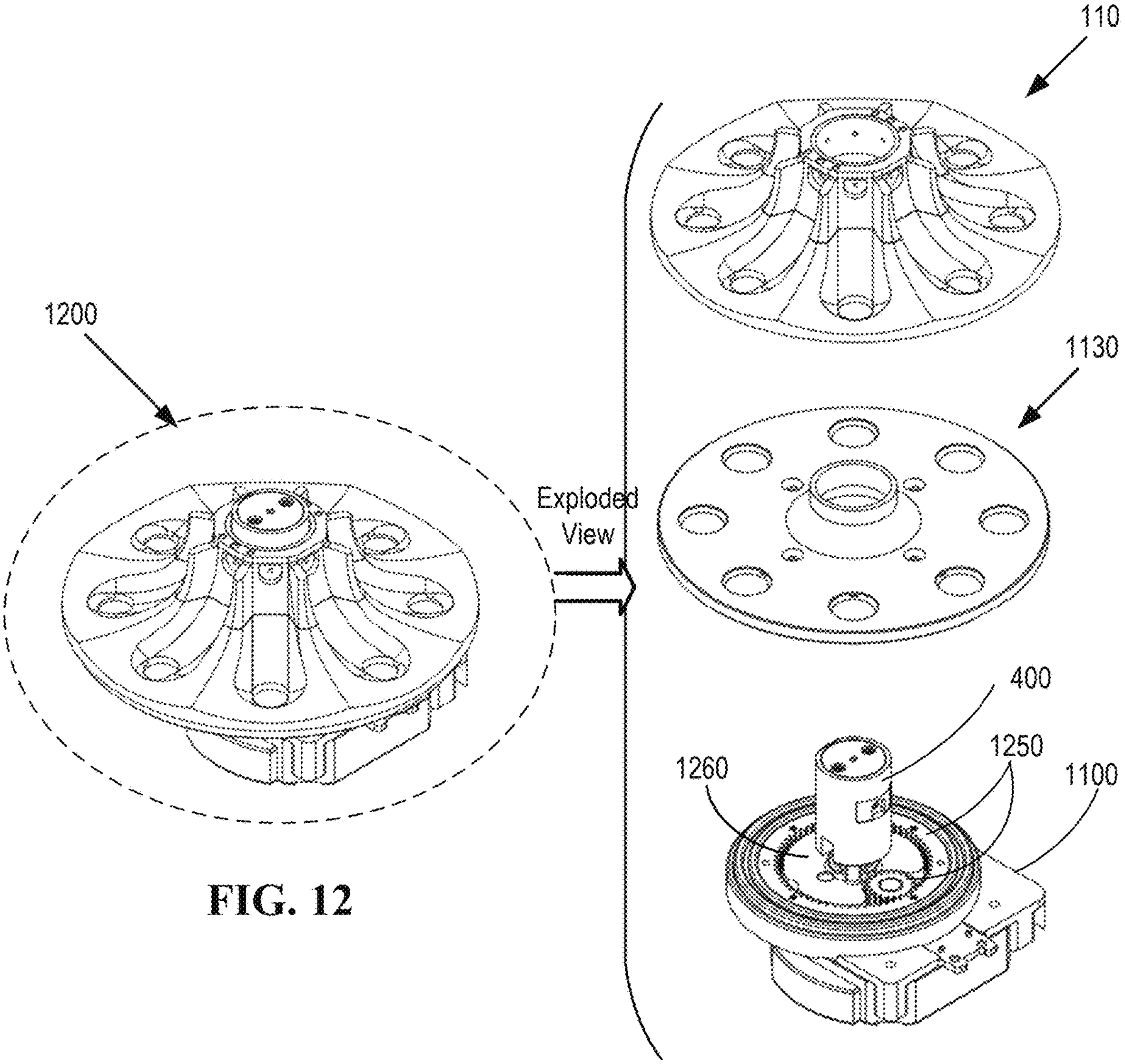
FIG. 12 illustrates an exploded view of a rotating assembly in the disk head according to one embodiment.

FIG. 11 illustrates a side vertical cross-section view of the disk head 210 when the disk lid 220 is closed according to one embodiment. FIG. 11 shows a motor module 1100 in the disk head 210. FIG. 12 is an exploded view of a disk head base assembly 1200 in the disk head 210 according to one embodiment. Referring to FIG. 11 and FIG. 12, a rotating platform 1130 is underneath the disk tray 110 and on top of the motor module 1100. A set of gears 1250 on the top side of the motor module 1100 are engaged with the bottom surface of the rotating platform 1130, which is underneath the disk tray 110. The motor module 1100 generates a rotational force to drive the gears 1250, which horizontally spin the rotating platform 1130, the disk tray 110, and the pods 120 (not shown) thereon. That is, the disk tray 110 and the pods 120 all rotate with the rotating platform 1130 horizontally around the vertical axis 118 (FIG. 1 (*c*)). The motor module 1100 further includes a stationary base 1260 that remains stationary. The air supply assembly 400 is on top of the stationary base 1260 and remains stationary when the rotating platform 1130 rotates.

Referring to FIG. 11, a downward-hanging tab 1135 is attached to a predetermined bottom-surface position of the rotating platform 1130. As an example, this bottom-surface position may be on the centerline of a given slot of the disk tray 110. The tab 1135 protrudes downwards and rotates with the rotating platform 1130. The disk head 210 includes a sensor module 1120 underneath the rotating platform 1130. The sensor module 1120 is at a marked position of the disk head 210 (e.g., on the centerline of the disk head 210). The sensor module 1120 is stationary and does not rotate with the rotating platform 1130. The sensor module 1120 can detect the presence of the tab 1135 and determine how much (e.g., the rotational angle) that the disk head platform 1130 has rotated from the marked position. In one embodiment, the sensor module 1120 includes a transmitter on one side and a receiver on the other side of a notch 1125. The transmitter 1133 and the receiver face each other and a light may be transmitted continuously from the transmitter to the receiver. When the tab 1135 moves into the notch 1125 between the two sides to block the light transmission, the receiver detects the presence of the tab 1135 and determines that the given disk tray slot has rotated to the marked position.

In an embodiment where the disk tray 110 carries N pods maximum, each pod 120 can be rotated to the front position of the disk head 210 to receive compressed air from the air delivery assembly 400 and to sprays from its nozzle. Only the pod 120 at the front position can receive compressed air from the air delivery assembly 400. Thus, each time the disk tray 110 rotates a multiple of (360/N) degrees, another pod 120 on the disk tray 110 is rotated to the front position to spray. To create a diffused spraying effect, the spray disk 110 may be horizontally rotated by an angle smaller than (360/N) degrees. This small angle is referred to as a "diffusion angle." For example, when N=8 and 360/8=45, the spray disk 110 may be rotated by 15 degrees right and left to create the diffusion effect. The air delivery assembly 400 does not rotate with the spray disk 110. Referring also to FIG. 3A and FIG. 3B, when the disk tray 110 rotates by the diffusion angle, the air hole 340 on the disk tray 110 is no longer aligned with the air outlet 363 of the nozzle slider 350. However, the air hole 340 on the disk tray 110 is still within the coverage of the lip 361 and the concave air output mouth 362. Thus, the front-positioned pod 120 can still receive compressed air when the spray disk 110 rotates within the diffusion angle.

When a user opens the disk lid 220 to remove or replace one or more of the pods 120, the user may take out the disk tray 110 from the disk head 210 first. When the disk lid 220 is opened, the nozzle slider 350 moves backward to its original position and releases the air sealing around the air hole 340 on the disk tray 110. The release of the air sealing makes it easier for the user to remove the disk tray 210 from the disk head 210 as the resistance force is reduced. Furthermore, as the nozzle slider 350 does not tightly press against the sealing rubber layer 330 when the user removes the disk tray 210, the abrasion of the sealing rubber layer 330 is reduced and the lifespan of the sealing rubber layer 330 can be prolonged.

Figure 13:
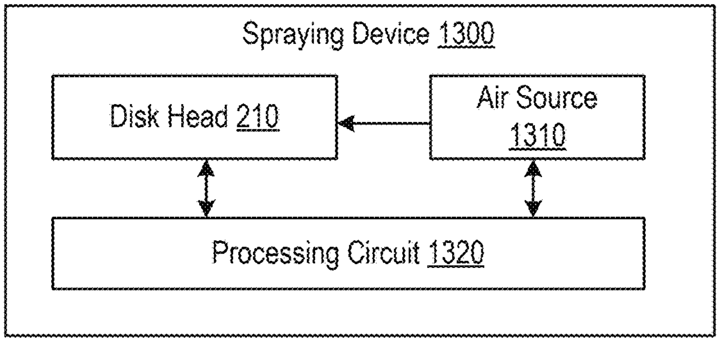
FIG. 13 is a block diagram illustrating a spraying device according to one embodiment.

FIG. 13 is a block diagram illustrating a spraying device 1300 according to one embodiment. The spraying device 1300 includes the disk head 210 operative to receive compressed air from an air source 1310 such as an air pump. The spraying device 1300 further includes a processing circuit 1320 to control the operations of the disk head 210 and the air source 1310. Additional components of the spraying device 1300 are omitted to simplify the illustration.

An air supply assembly is provided in a spraying device for delivering compressed air to a pod that includes a nozzle and contains a liquid. The air supply assembly includes a nozzle slider and a slider cover. The nozzle slider includes a concave air output mouth facing a front side of the spraying device, a backward-facing slanted surface, a groove at a bottom end of the slanted surface, and an air tube to receive the compressed air. The slider cover is on top of the nozzle slider. A bottom surface of the slider cover includes a peg extending downward. When the slider cover is pushed down, the peg moves down the slanted surface into the groove and the nozzle slider moves forward to form an air-sealed contact with an inner side of a center wall of a disk tray, to thereby deliver the compressed air through an air hole in the center wall to the pod. The pod is on the disk tray and at an outer side of the center wall. When the slider cover moves back up, the peg moves up the slanted surface and the nozzle slider moves backward. The nozzle slider does not rotate when the disk tray rotates horizontally.

In one embodiment, the concave air output mouth is surrounded by a lip elongated sideways. When the disk tray rotates by a diffusion angle within a coverage of the lip, the compressed air is delivered through the air hole to the pod. The air supply assembly further includes a cylindrical holder having an elongated opening at the front side and the nozzle slider inside. The lip of the nozzle slider fits into the elongated opening.

In one embodiment, a back section of the nozzle slider is attached to a spring module having horizontal springs extending forward. The horizontal springs are compressed when the nozzle slider moves forward and expand to an original length when the nozzle slider moves backward. In one embodiment, the bottom surface of the slider cover further includes vertical springs extending downward. The vertical springs are compressed when the disk lid closes and expand to an original length when the disk lid opens. In one embodiment, the nozzle slider further includes a stopper attached to a back section of the nozzle slider to stop backward movement of the nozzle slider when the slider cover moves back up.

In one embodiment, a flexible air pipe is attached to a bottom of the nozzle slider to deliver the compressed air from an air source through the nozzle slider. The flexible air pipe bends forward when the nozzle slider moves forward.

A disk head of a spraying device is provided for delivering compressed air to a pod that includes a nozzle and contains a liquid. The disk head includes a disk tray on which the pod is placed, the disk tray including a center wall that defines a hollow center. The disk head further includes a motor module to rotate the disk tray horizontally around a vertical axis that extends through the hollow center of the disk tray. The disk head further includes the aforementioned air supply assembly.

In one embodiment, the disk head includes a disk lid on top of the slider cover. When the disk lid closes, the slider cover is pushed down by the disk lid and the nozzle slider is pushed forward by the peg attached to the slider cover.

In one embodiment, the inner side of the center wall of the disk tray includes a sealing rubber layer. In one embodiment, the disk tray includes a top portion made of a first material and a bottom portion made of a second material different from the first material. The top portion contains the air hole. The second material is transparent or translucent. In one embodiment, the pod includes a top peg having a circular-shaped opening surrounded by a sealing rubber ring. The circular-shaped opening is aligned with the air hole of the disk tray.

In one embodiment, the disk head includes a rotating platform underneath the disk tray and rotates with the disk tray. The rotating platform includes a tab extending downward and attached to a bottom-surface position of the rotating platform. The disk head further includes a stationary sensor module underneath the rotating platform to detect presence of the tab. The stationary sensor module includes a transmitter on a first side of a notch, and a receiver on a second side of the notch opposite the first side. The stationary sensor module detects the presence of the tab when the tab moves into the notch.

In one embodiment, the motor module includes gears and a stationary base. The gears engage a bottom surface of a rotating platform underneath the disk tray to rotate the rotating platform. The air delivery assembly is on top of the stationary base and remains stationary when the rotating platform rotates.

In one embodiment, the disk tray includes multiple side fins horizontally arranged around the center wall, and between adjacent ones of the side fins is a slot to receive one of the pods. The pod that is rotated to a front-facing slot of the disk tray receives the compressed air from the air delivery assembly.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. An air supply assembly in a spraying device for delivering compressed air to cause a liquid to be sprayed at a spray target, comprising:

a nozzle slider including a concave air output mouth from which the compressed air flows out in a forward direction toward the spray target, a backward-facing slanted surface, a groove at a bottom end of the slanted surface, and an air tube to receive the compressed air;

a slider cover on top of the nozzle slider, a bottom surface of the slider cover including a peg extending downward; and a spring module attached to a back end of the nozzle slider, the spring module including springs extending in the forward direction, wherein when the slider cover is pushed down, the peg moves down the slanted surface into the groove and the nozzle slider moves in the forward direction to deliver the compressed air in the forward direction, wherein movement of the nozzle slider in the forward direction causes the springs to compress, and when the slider cover moves back up, the peg moves up the slanted surface and the springs expand to move the nozzle slider in a backward direction.

2. The air supply assembly of claim 1, wherein the concave air output mouth is surrounded by a lip elongated sideways.

3. The air supply assembly of claim 1, further comprising a flexible air pipe attached to a bottom of the nozzle slider to deliver the compressed air from an air source through the nozzle slider, wherein the flexible air pipe bends forward when the nozzle slider moves forward.

4. The air supply assembly of claim 1, wherein the air supply assembly is part of a disk head which includes a disk lid on top, and wherein when the disk lid closes, the slider cover is pushed down by the disk lid and the nozzle slider is pushed forward by the peg attached to the slider cover.

5. The air supply assembly of claim 4, wherein the bottom surface of the slider cover further includes vertical springs extending downward, wherein the vertical springs are compressed when the disk lid closes and expand to an original length when the disk lid opens.

6. The air supply assembly of claim 1, further comprising:

a cylindrical holder having an elongated opening, wherein the nozzle slider is inside the cylindrical holder, and wherein a lip surrounding the concave air output mouth of the nozzle slider fits into the elongated opening.

7. The air supply assembly of claim 1, wherein the nozzle slider further comprises a stopper attached to a back section of the nozzle slider to stop backward movement of the nozzle slider when the slider cover moves back up.

8. A disk head of a spraying device for delivering compressed air to cause a liquid to be sprayed at a spray target, comprising:

a disk tray to carry one or more liquid-containing pods, the disk tray including a center wall that defines a hollow center;

a rotating platform to receive and rotate the disk tray horizontally around a vertical axis that extends through the hollow center of the disk tray; and an air supply assembly, wherein the air supply assembly comprises:

a nozzle slider including a concave air output mouth from which the compressed air flows out in a forward direction toward the spray target, a backward-facing slanted surface, a groove at a bottom end of the backward-facing slanted surface, and an air tube to receive the compressed air; and a slider cover on top of the nozzle slider, a bottom surface of the slider cover including a peg extending downward, wherein when the slider cover is pushed down, the peg moves down the slanted surface into the groove and the nozzle slider moves in the forward direction to form an air-sealed contact with an inner side of the center wall of the disk tray and to deliver the compressed air through an air hole in the center wall to one of the liquid-containing pods, and when the slider cover moves back up, the peg moves up the slanted surface and the nozzle slider moves in a backward direction, and wherein the air supply assembly stays stationary when the rotating platform rotates.

9. The disk head of claim 8, wherein the concave air output mouth is surrounded by a lip elongated sideways.

10. The disk head of claim 8, further comprising a spring module attached to a back end of the nozzle slider, the spring module including springs extending in the forward direction, wherein the springs are compressed when the nozzle slider moves in the forward direction and expand to move the nozzle slider in the backward direction when the slider cover moves back up.

11. The disk head of claim 8, further comprising a flexible air pipe attached to a bottom of the nozzle slider to deliver the compressed air from an air source, wherein the flexible air pipe bends forward when the nozzle slider moves forward.

12. The disk head of claim 8, further comprising:

a disk lid on top of the slider cover, and wherein, when the disk lid closes, the slider cover is pushed down by the disk lid and the nozzle slider is pushed forward by the peg attached to the slider cover.

13. The disk head of claim 8, wherein the inner side of the center wall of the disk tray includes a sealing rubber layer.

14. The disk head of claim 8, wherein the disk tray includes a top portion made of a first material and a bottom portion made of a second material different from the first material, the top portion containing the air hole, and the second material is transparent or translucent.

15. The disk head of claim 8, further comprising:

a stationary sensor module underneath the rotating platform to detect presence of a tab that extends downward and is attached to a bottom-surface position of the rotating platform, wherein the stationary sensor module includes a transmitter on a first side of a notch, and a receiver on a second side of the notch opposite the first side, wherein the stationary sensor module detects the presence of the tab when the tab moves into the notch.

16. The disk head of claim 8, further comprising a motor module that includes gears and a stationary base, the gears to engage a bottom surface of the rotating platform underneath the disk tray to rotate the rotating platform, and wherein the air supply assembly is on top of the stationary base and remains stationary when the rotating platform rotates.

17. The disk head of claim 8, wherein the bottom surface of the slider cover further includes vertical springs extending downward, wherein the vertical springs are compressed when the disk lid closes and expand to an original length when the disk lid opens.

18. The disk head of claim 8, wherein the disk tray includes a plurality of side fins horizontally arranged around the center wall, and between adjacent ones of the side fins is a slot to receive one of the liquid-containing pods.

* * * * *